United States Patent
Beatty et al.

(10) Patent No.: US 12,455,575 B2
(45) Date of Patent: Oct. 28, 2025

(54) SYSTEMS AND METHODS FOR USING REINFORCEMENT LEARNING AGENTS TO TRACK TARGETS BASED ON A REWARD INCLUDING AN INFORMATION METRIC REWARD

(71) Applicant: General Dynamics Mission Systems, Inc., Fairfax, VA (US)

(72) Inventors: Emily Beatty, Arlington, VA (US); Eric Dong, Pittsburgh, PA (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 195 days.

(21) Appl. No.: 18/494,360

(22) Filed: Oct. 25, 2023

(65) Prior Publication Data

US 2025/0138540 A1    May 1, 2025

(51) Int. Cl.
*G05D 1/00* (2024.01)
*G06N 3/092* (2023.01)

(52) U.S. Cl.
CPC .......... *G05D 1/104* (2013.01); *G05D 1/0088* (2013.01); *G05D 1/12* (2013.01); *G06N 3/092* (2023.01)

(58) Field of Classification Search
CPC ........ G05D 1/104; G05D 1/0088; G05D 1/12; G06N 3/092; G06N 3/006
See application file for complete search history.

(56) References Cited

U.S. PATENT DOCUMENTS

2024/0038076 A1\* 2/2024 Omi et al. ........... G08G 5/0039

\* cited by examiner

*Primary Examiner* — Brodie J Follman
(74) *Attorney, Agent, or Firm* — Ingrassia Fisher & Lorenz, LLP

(57) ABSTRACT

An estimated target position is generated based on agent data received from an agent sensor system of a reinforcement learning (RL) agent and teammate data received from a plurality of teammate RL agents. An information metric reward is generated based on a confidence level associated with the estimated target position. The confidence level is based on the estimated target position and historical estimated target positions. A distance metric reward is generated based on an agent position and the estimated target position. A combined reward is generated based on the information metric reward and the distance metric reward. A movement action is generated for the RL agent based on the agent position, the estimated target position, and the combined reward in accordance with a multi-agent reinforcement learning (MARL) algorithm.

20 Claims, 4 Drawing Sheets

SYSTEMS AND METHODS FOR USING REINFORCEMENT LEARNING AGENTS TO TRACK TARGETS BASED ON A REWARD INCLUDING AN INFORMATION METRIC REWARD

TECHNICAL FIELD

The present invention generally relates to reinforcement learning agents and more particularly relates to systems and methods for using reinforcement learning (RL) agents to track targets based on a reward including an information metric reward.

BACKGROUND

Agents, such as for example, unmanned aerial vehicles (UAVs), are often used for intelligence, surveillance, and reconnaissance (ISR). UAVs performing ISR can carry out missions that would be too dangerous or otherwise too complicated for manned systems to complete.

Due to the complexity and collaboration needed among UAVs to track targets, the use of scripted autonomy or traditional sensor management alone may not suffice. Missions can be highly dynamic where suboptimal conditions may occur. For example, if the number of targets greatly outnumber the number of tracking sensors of UAVs, traditional scripted autonomy would perform poorly since it is impossible to include every possible scenario and variation in the script. Additionally, traditional techniques for scanning important areas for targets use pre-planned algorithms so sensor resources are often not used efficiently. Previous research conducted on Information Theoretic Sensor Management (ITSM) may mitigate these issues by optimizing sensor movements using information gain. However, ITSM relies on estimations of the information gain at runtime which can lead to suboptimal performance in many complex scenarios.

Explicit multi-agent information theoretic optimizations typically present challenges, that involve the use of approximations and computational shortcuts to determine the expected information gain of an action implemented by a UAV. The use of such approximations to enable distributed optimization often comes at the cost of efficiency in terms of under-utilization of certain UAV sensors during target tracking operations. While some techniques introduce multi-step planning to address this issue, these may come at the cost of an additional computational burden.

The discussed techniques often struggle with the difficulty of computing the maximal expected information gain, which involves reasoning over all possible actions of sensors of the agents and the targets. This may lead to suboptimal performance of tracking targets and surveying an area as well as sensor resources of agents being used inefficiently.

Hence, there is a need for systems and methods using reinforcement learning agents to track targets based on a reward including an information metric reward. The systems and methods includes a plurality of reinforcement learning (RL) agents to track targets using information theoretic metrics as reward functions in a Multi-Agent Reinforcement Learning (MARL) algorithm. The RL agents are trained to select actions which maximize expected information gain without having to estimate this quantity at runtime. This approach has the potential to out-perform existing techniques, which rely on truncated estimates of expected information due to computational limitations.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a reinforcement learning (RL) agent includes a sensor system, a communication system, and a target tracking system. The target tracking system includes at least one processor and at least one memory communicatively coupled to the at least one processor. The at least one memory includes instructions that upon execution by the at least one processor, cause the at least one processor to: receive agent data including an agent position and sensor target data from the sensor system; receive teammate data from a plurality of teammate RL agents via the communication system, the teammate data for each of the plurality of teammate RL agents including a teammate position and teammate sensor target data; generate an estimated target position of a target based on the agent data and the teammate data; generate an information metric reward based on a confidence level associated with the estimated target position, the confidence level being based on the estimated target position and historical estimated target positions for the target; generate a distance metric reward based on the agent position and the estimated target position; generate a combined reward based on the information metric reward and the distance metric reward; and generate a movement action for the RL agent based on the agent position, the estimated target position, and the combined reward in accordance with a multi-agent reinforcement learning (MARL) algorithm.

In various embodiments, a method of tracking a target by a reinforcement learning (RL) agent includes: receiving agent data including an agent position and sensor target data from a sensor system of the RL agent; receiving teammate data from a plurality of teammate RL agents via a communication system of the RL agent, the teammate data for each of the plurality of teammate agents comprising a teammate agent position and teammate sensor target data; generating an estimated target position of the target based on the agent data and the teammate data; generating an information metric reward based on a confidence level associated with the estimated target position, the confidence level being based on the estimated target position and historical estimated target positions for the target; a distance metric reward based on the agent position and the estimated target position; generating a combined reward based on the information metric reward and the distance metric reward; and generating a movement action for the RL agent based on the agent position, the estimated target position, and the combined reward in accordance with a multi-agent reinforcement learning (MARL) algorithm.

Furthermore, other desirable features and characteristics of the system and method using RL agents to track targets based on a combined reward including an information metric reward become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
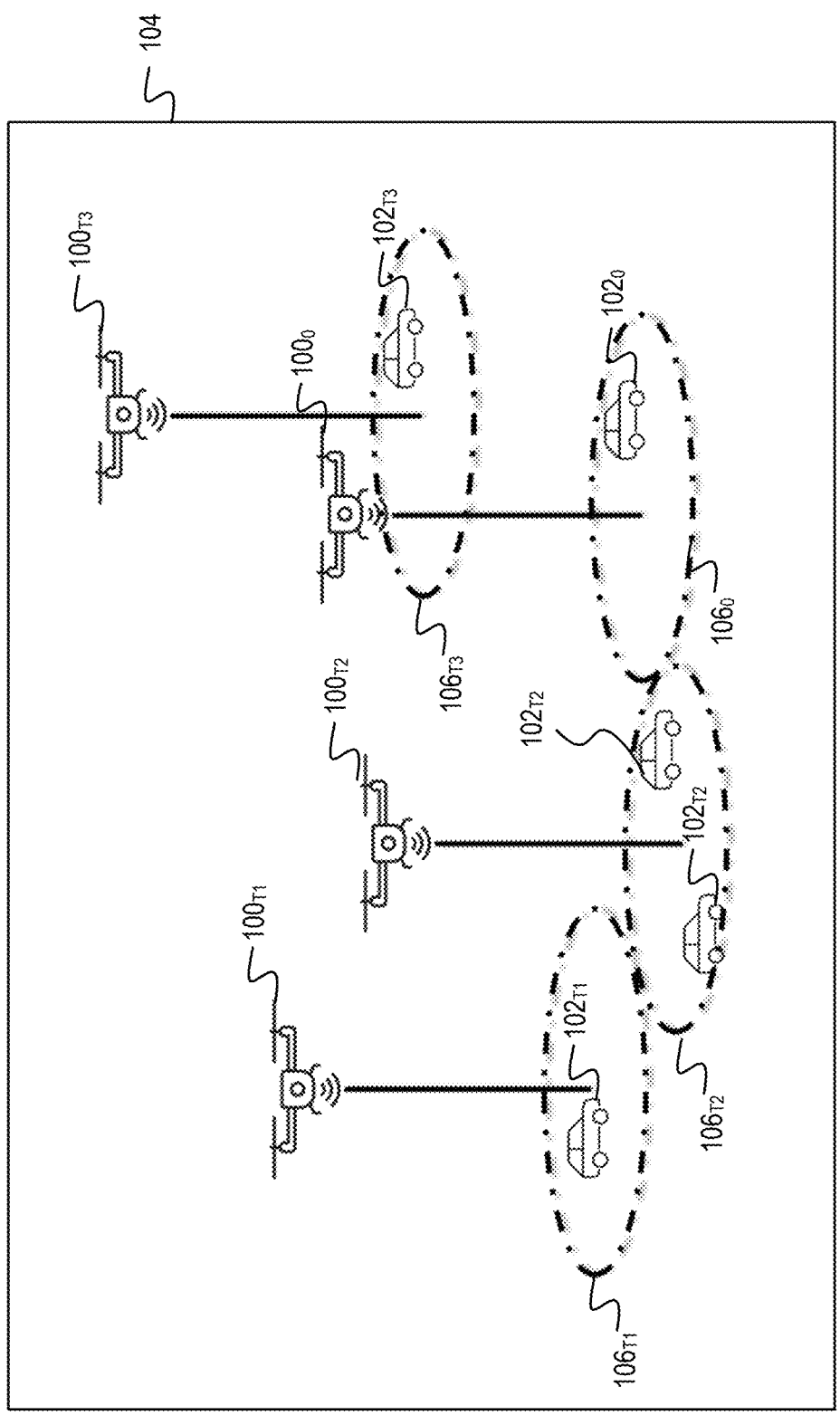
FIG. 1 is an exemplary representation of a plurality reinforcement (RL) agents configured to track targets within a finite environment in accordance with at least one embodiment.

Referring to FIG. 1, an exemplary representation of a plurality reinforcement (RL) agents $100_0$, $100_{T1}$, $100_{T2}$, $100_{T3}$ configured to track targets $102_0$, $102_{T1}$, $102_{T2}$, $102_{T3}$ within a finite environment 104 in accordance with at least one embodiment is shown. In at least one embodiment, the RL agents $100_0$, $100_{T1}$, $100_{T2}$, $100_{T3}$ are unmanned aerial vehicles (UAVs). The finite environment 104 is a predefined region. The RL agents $100_0$, $100_{T1}$, $100_{T2}$, $100_{T3}$ are mobile RL agents that are configured to move within the finite environment 104. The targets $102_0$, $102_{T1}$, $102_{T2}$, $102_{T3}$ are mobile targets disposed within the finite environment 104. While the plurality of RL agents are shown as including four RL agents, the plurality of RL agents may include fewer or greater number of RL agents.

Each RL agent $100_0$, $100_{T1}$, $100_{T2}$, $100_{T3}$ includes a sensor system, a communication system, and a target tracking system. Each RL agent $100_0$, $100_{T1}$, $100_{T2}$, $100_{T3}$ is configured to receive its own agent position from its sensor system. Each RL agent $100_0$, $100_{T1}$, $100_{T2}$, $100_{T3}$ is configured to receive sensor target data from its sensor system. In at least one embodiment, each RL agent $100_0$, $100_{T1}$, $100_{T2}$, $100_{T3}$ is configured to receive its own agent velocity from its sensor system.

Each sensor system of an RL agent $100_0$, $100_{T1}$, $100_{T2}$, $100_{T3}$ has a sensor region $106_0$, $106_{T1}$, $106_{T2}$, $106_{T3}$. The sensor system for each RL agent $100_0$, $100_{T1}$, $100_{T2}$, $100_{T3}$ is configured to detect sensor target data associated with the targets $102_0$, $102_{T1}$, $102_{T2}$, $102_{T3}$ disposed within the sensor region $106_0$, $106_{T1}$, $106_{T2}$, $106_{T3}$ of the sensor system of that RL agent $100_0$, $100_{T1}$, $100_{T2}$, $100_{T3}$ during successive time steps. For example, the sensor system of the RL agent $100_0$ at the current agent position is configured to detect sensor target data in a sensor region $106_0$ during a time step. The RL agent $100_0$ is configured to receive the sensor target data for the target $102_0$ disposed within the sensor region $106_0$. The sensor system of the RL agent $100_{T1}$ at the current agent position is configured to detect sensor target data in a sensor region $106_{T1}$ during the time step. The RL agent $100_{T1}$ is configured to receive the sensor target data for the target $102_{T1}$ disposed within the sensor region $106_{T1}$. The sensor system of the RL agent $100_{T2}$ at the current agent position is configured to detect sensor target data in a sensor region $106_{T2}$ during the time step. The RL agent $100_{T2}$ is configured to receive the sensor target data for the targets $102_{T2}$ disposed within the sensor region $106_{T2}$. The sensor system of the RL agent $100_{T3}$ at the current agent position is configured to detect sensor target data in a sensor region $106_{T3}$ during the time step. The RL agent $100_{T3}$ is configured to receive the sensor target data for the target $102_{T3}$ disposed within the sensor region $106_{T3}$. The individual sensor region $106_0$, $106_{T1}$, $106_{T2}$, $106_{T3}$ monitored by each RL agent $100_0$, $100_{T1}$, $100_{T2}$, $100_{T3}$ changes as the RL agent $100_0$, $100_{T1}$, $100_{T2}$, $100_{T3}$ moves from one position to another position. Each of the RL agents $100_0$, $100_{T1}$, $100_{T2}$, $100_{T3}$ will only gather sensor data for the target(s) $102_0$, $102_{T1}$, $102_{T2}$, $102_{T3}$ disposed within the sensor region $106_0$, $106_{T1}$, $106_{T2}$, $106_{T3}$ of that RL agent $100_0$, $100_{T1}$, $100_{T2}$, $100_{T3}$. When a target $102_0$, $102_{T1}$, $102_{T2}$, $102_{T3}$ moves into the sensor region $106_0$, $106_{T1}$, $106_{T2}$, $106_{T3}$ of an RL agent $100_0$, $100_{T1}$, $100_{T2}$, $100_{T3}$, that RL agent $100_0$, $100_{T1}$, $100_{T2}$, $100_{T3}$ will collect sensor data associated with the target $102_0$, $102_{T1}$, $102_{T2}$, $102_{T3}$ that has moved into the sensor region $106_0$, $106_{T1}$, $106_{T2}$, $106_{T3}$ of that RL agent $100_0$, $100_{T1}$, $100_{T2}$, $100_{T3}$. For example, when a target $102_0$ moves into the sensor region $106_0$ of the RL agent $100_0$, the RL agent $100_0$ will collect sensor data associated with the target $102_0$.

The communication system for each RL agent $100_0$, $100_{T1}$, $100_{T2}$, $100_{T3}$ has a communication radius. Each RL agent $100_0$, $100_{T1}$, $100_{T2}$, $100_{T3}$ is configured to be communicatively coupled to each of the other RL agents $100_0$, $100_{T1}$, $100_{T2}$, $100_{T3}$. In various embodiments, the communication radius for each RL agent $100_0$, $100_{T1}$, $100_{T2}$, $100_{T3}$ is large enough to enable each RL agent $100_0$, $100_{T1}$, $100_{T2}$, $100_{T3}$ to communicate with the other RL agents $100_0$, $100_{T1}$, $100_{T2}$, $100_{T3}$ directly regardless of the position of that RL agent $100_0$, $100_{T1}$, $100_{T2}$, $100_{T3}$ within the finite environment 104. Each RL agent $100_0$, $100_{T1}$, $100_{T2}$, $100_{T3}$ is configured to receive teammate data from the other RL agents (teammate RL agents) $100_0$, $100_{T1}$, $100_{T2}$, $100_{T3}$ via the associated communication system. The teammate data received from each teammate RL agent $100_0$, $100_{T1}$, $100_{T2}$, $100_{T3}$ includes the teammate position and/or the teammate velocity for that teammate RL agent $100_0$, $100_{T1}$, $100_{T2}$, $100_{T3}$ and the teammate sensor target data collected by the sensor system of that teammate RL agent $100_0$, $100_{T1}$, $100_{T2}$, $100_{T3}$. For example, the RL agent $100_0$ is configured to receive teammate data from the teammate RL agents $100_{T1}$, $100_{T2}$, $100_{T3}$. The teammate data received by the RL agent $100_0$ includes the teammate position and/or velocity of each of the teammate RL agents $100_{T1}$, $100_{T2}$, $100_{T3}$ and the teammate sensor target data detected by the sensor systems of the each of the teammate RL agents $100_{T1}$, $100_{T2}$, $100_{T3}$.

The target tracking system for each RL agent $100_0$, $100_{T1}$, $100_{T2}$, $100_{T3}$ is configured to receive the agent data from the sensor system of that RL agent $100_0$, $100_{T1}$, $100_{T2}$, $100_{T3}$. The agent data includes the agent position and the sensor target data. In at least one embodiment, the agent data includes the agent velocity. The received sensor target data provides insight into the positions of the targets $102_0$, $102_{T1}$, $102_{T2}$, $102_{T3}$ disposed within the sensor region $106_0$, $106_{T1}$, $106_{T2}$, $106_{T3}$ of that RL agent $100_0$, $100_{T1}$, $100_{T2}$, $100_{T3}$. For example, the target tracking system for the RL agent $100_0$ is configured to receive the agent position, the sensor target data, and/or the agent velocity from its sensor system. The received sensor target data provides insight into the position of the target $102_0$ within the sensor region $106_0$ of the RL agent $100_0$. In various embodiments, sensor data is noisy and may have inaccuracies to simulate real sensor readings. A target tracking algorithm (also referred to as a target algorithm), such as for example a Kalman filter, can take sensor data as an input and output less noisy and potentially more accurate target position estimates.

The target tracking system for each RL agent $100_0$, $100_{T1}$, $100_{T2}$, $100_{T3}$ is configured to receive the teammate data from the teammate RL agent $100_0$, $100_{T1}$, $100_{T2}$, $100_{T3}$ via its communication system. The teammate data includes teammate position and teammate sensor target data for each teammate RL agent $100_0$, $100_{T1}$, $100_{T2}$, $100_{T3}$. In at least one embodiment, the teammate data include teammate velocity. The combination of the sensor target data received from its own sensor system and the teammate sensor target data received from the teammate RL agents $100_0$, $100_{T1}$, $100_{T2}$, $100_{T3}$ provides the target tracking system of an RL agent $100_0$, $100_{T1}$, $100_{T2}$, $100_{T3}$ with insight into the positions of targets $102_0$, $102_{T1}$, $102_{T2}$, $102_{T3}$ disposed within the combined sensor regions $106_0$, $106_{T1}$, $106_{T2}$, $106_{T3}$ of the plurality of RL agents $100_0$, $100_{T1}$, $100_{T2}$, $100_{T3}$. The RL agents $100_0$, $100_{T1}$, $100_{T2}$, $100_{T3}$ do not know the actual positions of the targets $102_0$, $102_{T1}$, $102_{T2}$, $102_{T3}$. The combination of the sensor target data received from its own sensor system and the teammate sensor target data received from the teammate RL agents $100_0$, $100_{T1}$, $100_{T2}$, $100_{T3}$ enable the target tracking system of an RL agent $100_0$, $100_{T1}$, $100_{T2}$, $100_{T3}$ to estimate the positions of targets $102_0$, $102_{T1}$, $102_{T2}$, $102_{T3}$ disposed within the combined sensor regions $106_0$, $106_{T1}$, $106_{T2}$, $106_{T3}$ of the plurality of RL agents $100_0$, $100_{T1}$, $100_{T2}$, $100_{T3}$.

For example, the target tracking system for the RL agent $100_0$ is configured to receive the sensor target data from its own sensor system and the teammate sensor target data from the teammate RL agents $100_{T1}$, $100_{T2}$, $100_{T3}$ via its communication system. The combination of the target sensor data received from its own sensor system and the received teammate sensor target data provides insight into the positions of targets $102_0$, $102_{T1}$, $102_{T2}$, $102_{T3}$ disposed within the combined sensor region $106_0$, $106_{T1}$, $106_{T2}$, $106_{T3}$ of the plurality or RL agents $100_0$, $100_{T1}$, $100_{T2}$, $100_{T3}$ during a time step.

The target tracking system for each of the plurality or RL agents $100_0$, $100_{T1}$, $100_{T2}$, $100_{T3}$ is configured to generate estimated target positions of the targets $102_0$, $102_{T1}$, $102_{T2}$, $102_{T3}$ disposed with the combined sensor regions $106_0$, $106_{T1}$, $106_{T2}$, $106_{T3}$ of the plurality or RL agents $100_0$, $100_{T1}$, $100_{T2}$, $100_{T3}$ based on the agent data and the teammate data. The target tracking system for each of the plurality or RL agents $100_0$, $100_{T1}$, $100_{T2}$, $100_{T3}$ is configured to generate a confidence level associated with each of the estimated target positions of the targets $102_0$, $102_{T1}$, $102_{T2}$, $102_{T3}$ disposed within the combined sensor region $106_0$, $106_{T1}$, $106_{T2}$, $106_{T3}$ of the plurality of RL agents $100_0$, $100_{T1}$, $100_{T2}$, $100_{T3}$. The target tracking system for each of the plurality or RL agents $100_0$, $100_{T1}$, $100_{T2}$, $100_{T3}$ is configured to maintain historical estimated target positions of the targets $102_0$, $102_{T1}$, $102_{T2}$, $102_{T3}$ obtained during previous time steps. The confidence level associated with an estimated target positions for a target $102_0$, $102_{T1}$, $102_{T2}$, $102_{T3}$ is based on the estimated target position during a current time step and historical estimated target positions for that target $102_0$, $102_{T1}$, $102_{T2}$, $102_{T3}$ during previous time steps. The target tracking system for each of the plurality or RL agents $100_0$, $100_{T1}$, $100_{T2}$, $100_{T3}$ is configured to keep track of the previous estimated target positions of the targets $102_0$, $102_{T1}$, $102_{T2}$, $102_{T3}$ and the previous confidence levels associated with each of the previous estimated target positions of the targets $102_0$, $102_{T1}$, $102_{T2}$, $102_{T3}$. Confidence level may also be referred to as covariance.

For each RL agent $100_0$, $100_{T1}$, $100_{T2}$, $100_{T3}$, when a target $102_0$, $102_{T1}$, $102_{T2}$, $102_{T3}$ is detected within its sensor region $106_0$, $106_{T1}$, $106_{T2}$, $106_{T3}$, the estimated target position for that target $102_0$, $102_{T1}$, $102_{T2}$, $102_{T3}$ and the confidence level associated with the estimated target position for that target $102_0$, $102_{T1}$, $102_{T2}$, $102_{T3}$ is updated using the newly obtained sensor target data. The confidence level will be relatively high since the target $102_0$, $102_{T1}$, $102_{T2}$, $102_{T3}$ is disposed within the sensor region $106_0$, $106_{T1}$, $106_{T2}$, $106_{T3}$ of that RL agent $100_0$, $100_{T1}$, $100_{T2}$, $100_{T3}$.

For each RL agent $100_0$, $100_{T1}$, $100_{T2}$, $100_{T3}$, when a target $102_0$, $102_{T1}$, $102_{T2}$, $102_{T3}$ is not detected within its sensor region $106_0$, $106_{T1}$, $106_{T2}$, $106_{T3}$, the estimated target position for that target $102_0$, $102_{T1}$, $102_{T2}$, $102_{T3}$ and the confidence level associated with the estimated target position for that target $102_0$, $102_{T1}$, $102_{T2}$, $102_{T3}$ during the current time step is updated using historical estimated target position for that target $102_0$, $102_{T1}$, $102_{T2}$, $102_{T3}$ and historical confidence levels associated with the estimated target position for that target $102_0$, $102_{T1}$, $102_{T2}$, $102_{T3}$. The confidence level will be relatively low since the target $102_0$, $102_{T1}$, $102_{T2}$, $102_{T3}$ is not disposed within the sensor region $106_0$, $106_{T1}$, $106_{T2}$, $106_{T3}$ of that RL agent $100_0$, $100_{T1}$, $100_{T2}$, $100_{T3}$.

The target tracking system for each of the plurality of RL agents $100_0$, $100_{T1}$, $100_{T2}$, $100_{T3}$ is configured to select a target from the plurality of targets $102_0$, $102_{T1}$, $102_{T2}$, $102_{T3}$ for tracking by that RL agent $100_0$, $100_{T1}$, $100_{T2}$, $100_{T3}$. In at least one embodiment, the target tracking system for each of the plurality of RL agents $100_0$, $100_{T1}$, $100_{T2}$, $100_{T3}$ employs Lloyd's algorithm to select the target from the plurality of targets $102_0$, $102_{T1}$, $102_{T2}$, $102_{T3}$ for the RL agent $100_0$, $100_{T1}$, $100_{T2}$, $100_{T3}$ to track. In at least one embodiment, the target tracking system for each of the plurality of RL agents $100_0$, $100_{T1}$, $100_{T2}$, $100_{T3}$ selects the target that is closest to the RL agent $100_0$, $100_{T1}$, $100_{T2}$, $100_{T3}$. In at least one embodiment, the target tracking system for each of the plurality of RL agents $100_0$, $100_{T1}$, $100_{T2}$, $100_{T3}$ selects the target that the RL agent $100_0$, $100_{T1}$, $100_{T2}$, $100_{T3}$ was tracking during the previous time step.

The target tracking system for each of the plurality of RL agents $100_0$, $100_{T1}$, $100_{T2}$, $100_{T3}$ is configured to generate an information metric reward associated with the target $102_0$, $102_{T1}$, $102_{T2}$, $102_{T3}$ that was selected for tracking by that RL agent $100_0$, $100_{T1}$, $100_{T2}$, $100_{T3}$. The target tracking system for each of the plurality of RL agents $100_0$, $100_{T1}$, $100_{T2}$, $100_{T3}$ is configured to generate a confidence level associated with the estimated target position for the target $102_0$, $102_{T1}$, $102_{T2}$, $102_{T3}$ that was selected for tracking by that RL agent $100_0$, $100_{T1}$, $100_{T2}$, $100_{T3}$. The information metric reward associated with the selected target $102_0$, $102_{T1}$, $102_{T2}$, $102_{T3}$ is based on the confidence level associated with the estimated target position of the selected target $102_0$, $102_{T1}$, $102_{T2}$, $102_{T3}$. For example, if the target tracking system of the RL agent $100_0$ selected the target $102_0$ for tracking by the RL agent $100_0$, the target tracking system generates a confidence level associated with the estimated target position of the target $102_O$. The target tracking system generates an information metric reward associated with the target $102_O$ based on the confidence level associated with the estimated target position of the target $102_O$.

The target tracking system for each of the plurality of RL agents $100_O$, $100_{T1}$, $100_{T2}$, $100_{T3}$ is configured to generate a distance metric reward associated with the target $102_O$, $102_{T1}$, $102_{T2}$, $102_{T3}$ that was selected for tracking by that RL agent $100_O$, $100_{T1}$, $100_{T2}$, $100_{T3}$. The distance metric reward is based on a measured distance between the agent position of that RL agent $100_O$, $100_{T1}$, $100_{T2}$, $100_{T3}$ and the estimated target position of the selected target $102_O$, $102_{T1}$, $102_{T2}$, $102_{T3}$. For example, if the target tracking system of the RL agent $100_O$ selected the target $102_O$ for tracking by the RL agent $100_O$, the target tracking system generates a distance metric reward based on a measured distance between the agent position of the RL agent $100_O$ and the estimated target position of the selected target $102_O$.

The target tracking system is configured to generate a combined reward associated with the target $102_O$, $102_{T1}$, $102_{T2}$, $102_{T3}$ that was selected for tracking by the RL agent $100_O$, $100_{T1}$, $100_{T2}$, $100_{T3}$. The combined reward is based on the information metric reward and the distance metric reward associated with the selected target $102_O$, $102_{T1}$, $102_{T2}$, $102_{T3}$ for the RL agent $100_O$, $100_{T1}$, $100_{T2}$, $100_{T3}$. For example, if the target tracking system of the RL agent $100_O$ selected the target $102_O$ for tracking by the RL agent $100_O$, the target tracking system of RL agent $100_O$ is configured to generate a combined reward associated with the selected target $102_O$ based on the information metric reward and the distance metric reward associated with the selected target $102_O$ for the RL agent $100_O$.

The target tracking system for each of the plurality of RL agents $100_O$, $100_{T1}$, $100_{T2}$, $100_{T3}$ includes a multi-agent reinforcement learning (MARL) algorithm. The target tracking system is configured to update the policy of the MARL algorithm for each of the plurality of RL agents $100_O$, $100_{T1}$, $100_{T2}$, $100_{T3}$ based on the agent position of that RL agent $100_O$, $100_{T1}$, $100_{T2}$, $100_{T3}$, the estimated target position of the selected target $102_O$, $102_{T1}$, $102_{T2}$, $102_{T3}$, and the combined reward for that RL agent $100_O$, $100_{T1}$, $100_{T2}$, $100_{T3}$. A combined reward is generated for each RL agent $100_O$, $100_{T1}$, $100_{T2}$, $100_{T3}$ by its target tracking system. The combined reward generated by the target tracking system of an RL agent $100_O$, $100_{T1}$, $100_{T2}$, $100_{T3}$ is specific to that RL agent $100_O$, $100_{T1}$, $100_{T2}$, $100_{T3}$.

Individual RL agents $100_O$, $100_{T1}$, $100_{T2}$, $100_{T3}$ have policies that are specific to their MARL algorithm. The target tracking system for each of the plurality of RL agents $100_O$, $100_{T1}$, $100_{T2}$, $100_{T3}$ is configured to generate a movement action for the next time step for that RL agent $100_O$, $100_{T1}$, $100_{T2}$, $100_{T3}$ based on the agent position of that RL agent $100_O$, $100_{T1}$, $100_{T2}$, $100_{T3}$, the estimated target position of the selected target $102_O$, $102_{T1}$, $102_{T2}$, $102_{T3}$ for that RL agent $100_O$, $100_{T1}$, $100_{T2}$, $100_{T3}$, and the combined reward in accordance with the updated policy of the MARL algorithm for that RL agent $100_O$, $100_{T1}$, $100_{T2}$, $100_{T3}$. The movement action generated by the target tracking systems for each RL agent $100_O$, $100_{T1}$, $100_{T2}$, $100_{T3}$ is in connection with the tracking of the selected target $102_O$, $102_{T1}$, $102_{T2}$, $102_{T3}$ during the next time step.

Figure 2:
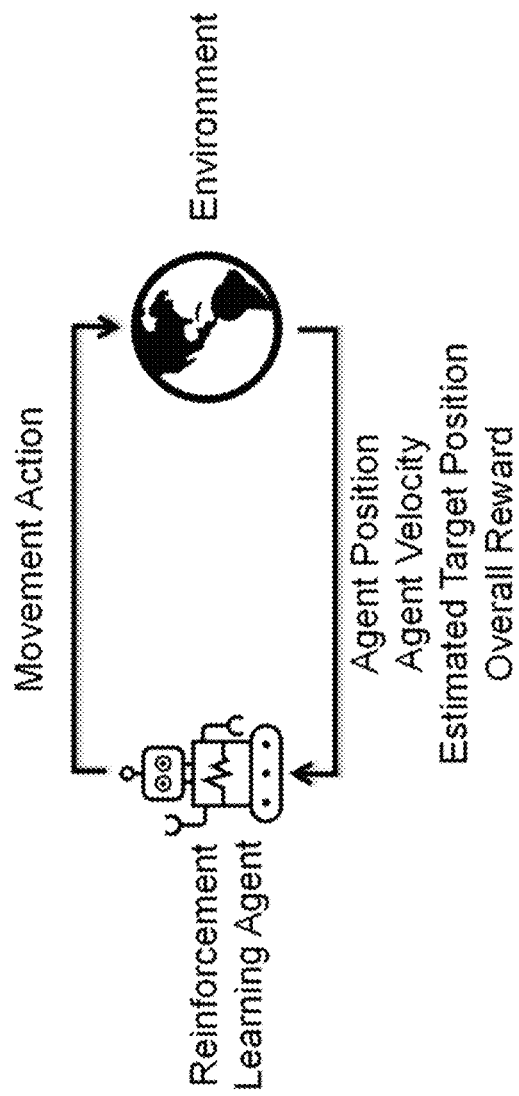
FIG. 2 is an illustration of a reinforcement learning method with respect to an RL agent in accordance with at least one embodiment.

Referring to FIG. 2, an illustration of a reinforcement learning method 200 with respect to an RL agent $100_O$ in accordance with at least one embodiment is shown. Reinforcement learning is a machine learning training method based on rewarding desired behaviors and punishing undesirable behaviors by an RL agent $100_O$. For example, the RL agent $100_O$ engages in a movement action during a time step. The RL agent $100_O$ receives states from the environment based on the implementation of the movement action during the time step. The states include the agent position and/or the agent velocity of the RL agent $100_O$ and the estimated target position of the selected target $102_O$ within the finite environment 104. The states are based on the agent data and the teammate data sensed by the RL agents $100_O$, $100_{T1}$, $100_{T2}$, $100_{T3}$ upon the implementation of the movement action by the RL agent $100_O$ during the time step. The reward generated by the target tracking system of the RL agent $100_O$ provides feedback regarding the movement action taken by the RL agent $100_O$ during the time step.

In various embodiments, the reward is a combined reward and is based on an information metric reward and a distance metric reward for the RL agent $100_O$ in connection with the selected target $102_O$. In various embodiments, the reward is based on an information metric reward for the RL agent $100_O$ in connection with the selected target $102_O$. In various embodiments, the reward is based on a distance metric reward for the RL agent $100_O$ in connection with the selected target $102_O$. It is each RL agent's goal to maximize the rewards that it receives. The MARL algorithm for the RL agent $100_O$ focuses on the behavior of multiple RL agents $100_O$, $100_{T1}$, $100_{T2}$, $100_{T3}$ that co-exist within the shared finite environment 104. Over time the MARL algorithm of the RL agent $100_O$ will learn the best movement actions for that RL agent $100_O$ to take during future time steps with respect to the selected target $102_O$ that the RL agent $100_O$ is tracking in different states based on experience gained during previous time steps.

Figure 3:
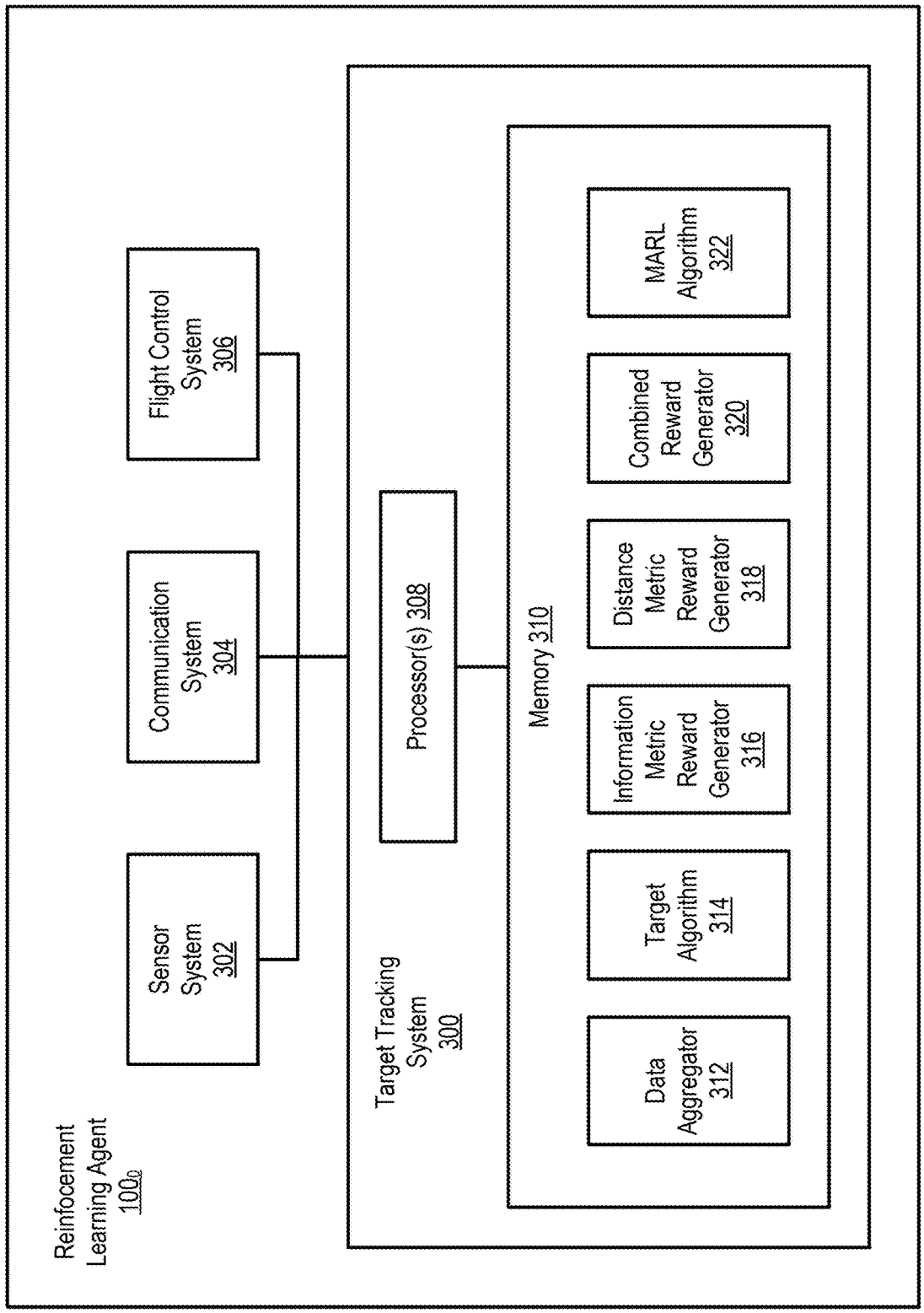
FIG. 3 is a block diagram representation of an RL agent in accordance with at least one embodiment.

Referring to FIG. 3, a block diagram representation of an RL agent $100_O$ in accordance with at least one embodiment is shown. In at least one embodiment, the RL agent $100_O$ is a UAV. The RL agent $100_O$ includes a target tracking system 300, a sensor system 302, a communication system 304, and a flight control system 306. The target tracking system 300 includes at least one processor 308 and at least one memory 310. The memory 310 includes a data aggregator 312, a target algorithm 314, an information metric reward generator 316, a distance metric reward generator 318, a combined reward generator 320, and a MARL algorithm 322. The RL agent $100_O$ may include additional components that facilitate operation of the RL agent $100_O$.

The processor(s) 308 is communicatively coupled to the at least one memory 310, the sensor system 302, the communication system 304, and the flight control system 306. The processor(s) 308 is a programable device that includes one or more instructions stored in or associated with the at least one memory 310. The at least one memory 310 includes instructions that the processor(s) 308 is configured to execute.

The at least one memory 310 is a computer readable storage device or media. The processor(s) 308 can be any custom made or commercially available processor, a central processing unit (CPU), a graphics processing unit (GPU), an auxiliary processor among several processors, a semiconductor-based microprocessor (in the form of a microchip or chip set), a microprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor(s) 308 is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the RL agent $100_0$. The instructions may include one or more separate programs, each of which comprises an ordered listing of executable instructions for implementing logical functions. The instructions, when executed by the processor(s) 308 perform logic, calculations, methods and/or algorithms to enable training of a MARL model. The MARL model is trained using combined rewards including information metric rewards. Upon deployment, the trained MARL model will enable an RL agent $100_0$, $100_{T1}$, $100_{T2}$, $100_{T3}$ to track a target $102_0$, $102_{T1}$, $102_{T2}$, $102_{T3}$ based on the predicted actions output by the trained MARL model.

The sensor system 302 is configured to generate agent data associated with the RL agent $100_0$. Examples of agent data include, but are not limited to, agent positions of the RL agent $100_0$, agent velocities of the RL agent $100_0$, and sensor target data. The sensor system 302 is configured to detect sensor target data within a sensor region $106_0$. In various embodiments, the sensor system 302 supplies, without limitation, one or more of: inertial reference system measurements providing a location, Flight Path Angle (FPA) measurements, velocity data, airspeed data, groundspeed data (including groundspeed direction), vertical speed data, vertical acceleration data, altitude data, attitude data including pitch data and roll measurements, yaw data, heading information, flight path data, flight track data, radar altitude data, and geometric altitude data.

The communication system 304 is configured to provide real-time bidirectional wireless data exchange between the RL agent $100_0$ and teammate RL agents $100_{T1}$, $100_{T2}$, $100_{T3}$. The RL agent $100_0$ transmits agent data to teammate RL agents $100_{T1}$, $100_{T2}$, $100_{T3}$ and receives teammate data from teammate RL agents $100_{T1}$, $100_{T2}$, $100_{T3}$ via the communication system 304.

The flight control system 306 is configured to control the power applied to motors and/or rotational speed of the RL agent $100_0$ to enable the implementation of movement actions of the RL agent $100_0$ during successive time steps. Examples of movement actions include, but are not limited to, a movement action forward, a movement action backward, a movement action to the left, and a movement action to the right. The operation of the target tracking system 300 will be described in greater detail below with reference to FIG. 4. The teammate RL agents $100_{T1}$, $100_{T2}$, $100_{T3}$ have a configuration similar to that described with respect to RL agent $100_0$.

Figure 4:
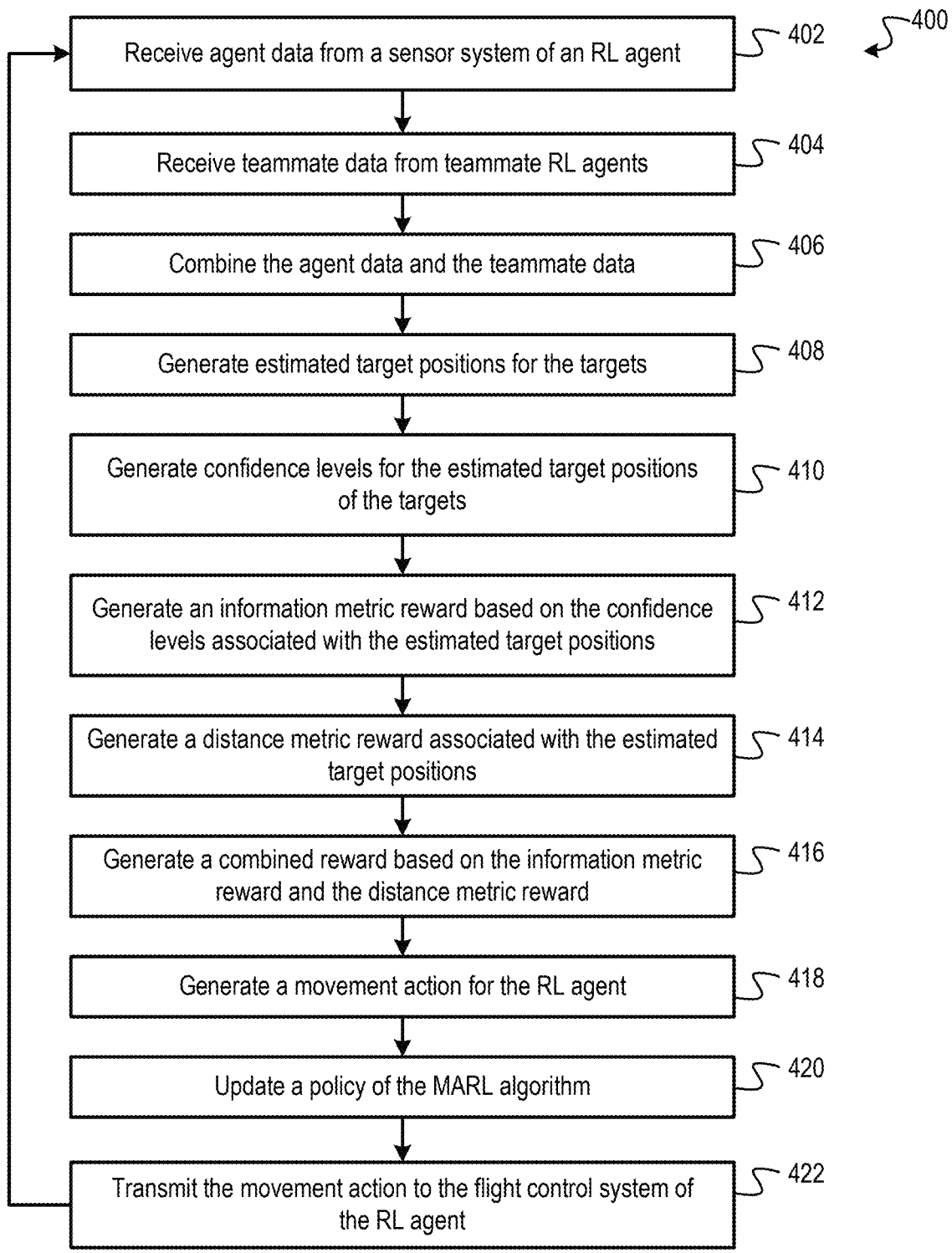
FIG. 4 is a flowchart representation of a method of using RL agents to track a target based on a combined reward including an information metric reward in accordance with at least one embodiment.

Referring to FIG. 4, a flowchart representation of a method 400 of using a plurality of RL agents $100_0$, $100_{T1}$, $100_{T2}$, $100_{T3}$ to track a target based on a combined reward including an information metric reward in accordance with at least one embodiment is shown. The method 400 will be described with reference to an exemplary implementation of a target tracking system 300. As can be appreciated in light of the disclosure, the order of operation within the method 400 is not limited to the sequential execution as illustrated in FIG. 4 but may be performed in one or more varying orders as applicable and in accordance with the present disclosure.

An RL agent $100_0$ includes a target tracking system 300. The RL agent $100_0$ is communicatively coupled to teammate RL agents $100_{T1}$, $100_{T2}$, $100_{T3}$. The RL agent $100_0$ and the teammate RL agents $100_{T1}$, $100_{T2}$, $100_{T3}$ are configured to track targets $102_0$, $102_{T1}$, $102_{T2}$, $102_{T3}$ in a finite environment 104.

At 402, agent data is received from a sensor system 302 of an RL agent $100_0$. The agent data is received at the target tracking system 300. In at least one embodiment, the agent data is received at a data aggregator 312. The sensor system 302 is configured to collect sensor target data from a sensor region $106_0$ associated with the sensor system 302 following a movement action implemented by the RL agent $100_0$ during a time step. The agent data includes an agent position of the RL agent $100_0$ and sensor target data collected by the sensor system 302 from the sensor region $106_0$. In at least one embodiment, the agent data includes an agent velocity of the RL agent $100_0$.

At 404, teammate data is received from the teammate RL agents $100_{T1}$, $100_{T2}$, $100_{T3}$ via the communication system 304 of the RL agent $100_0$. The teammate data is received at the target tracking system 300. In at least one embodiment, the teammate data is received at the data aggregator 312. The teammate data received from each teammate RL agent $100_{T1}$, $100_{T2}$, $100_{T3}$ includes a teammate position of the teammate RL agent $100_{T1}$, $100_{T2}$, $100_{T3}$ and teammate sensor target data collected by the sensor system 302 of the teammate RL agent $100_{T1}$, $100_{T2}$, $100_{T3}$ during the time step. In at least one embodiment, the teammate data includes a teammate velocity of each of the teammate RL agent $100_{T1}$, $100_{T2}$, $100_{T3}$. The sensor system 302 of each teammate RL agent $100_{T1}$, $100_{T2}$, $100_{T3}$ collects the sensor target data from the associated sensor region $106_{T1}$, $106_{T2}$, $106_{T3}$.

At 406, the agent data and the teammate data are combined to generate aggregated data. The target tracking system 300 generates the aggregated data. In at least one embodiment, the data aggregator 312 generates the aggregated data. The aggregated data is a combination of the sensor target data received from the RL agent's own sensor system 302 and the teammate sensor target data received from the teammate RL agents $100_{T1}$, $100_{T2}$, $100_{T3}$. The aggregated data provides the target tracking system 302 of the RL agent $100_0$ with insight into the positions of the targets $102_0$, $102_{T1}$, $102_{T2}$, $102_{T3}$ disposed within the combined sensor regions $106_0$, $106_{T1}$, $106_{T2}$, $106_{T3}$ of the RL agent $100_0$, and the teammate RL agents $100_{T1}$, $100_{T2}$, $100_{T3}$.

At 408, an estimated target position is generated for each of the targets $102_0$, $102_{T1}$, $102_{T2}$, $102_{T3}$ disposed within the combined sensor regions $106_0$, $106_{T1}$, $106_{T2}$, $106_{T3}$ of the RL agent $100_0$, and the teammate RL agents $100_{T1}$, $100_{T2}$, $100_{T3}$. The target tracking system 300 generates the estimated target positions for each of the targets $102_0$, $102_{T1}$, $102_{T2}$, $102_{T3}$ disposed within the combined sensor regions $106_0$, $106_{T1}$, $106_{T2}$, $106_{T3}$ of the RL agent $100_0$, and the teammate RL agents $100_{T1}$, $100_{T2}$, $100_{T3}$. In at least one embodiment, the target algorithm 314 generates the estimated target positions for each of the targets $102_0$, $102_{T1}$, $102_{T2}$, $102_{T3}$ disposed within the combined sensor regions $106_0$, $106_{T1}$, $106_{T2}$, $106_{T3}$ of the RL agent $100_0$, and the teammate RL agents $100_{T1}$, $100_{T2}$, $100_{T3}$. In at least one embodiment, the target algorithm 314 includes a Kalman filter. The aggregated data including the agent data and the teammate data are received at the Kalman filter. The Kalman filter generates the estimated target positions for each of the targets $102_0$, $102_{T1}$, $102_{T2}$, $102_{T3}$ disposed within the combined sensor regions $106_0$, $106_{T1}$, $106_{T2}$, $106_{T3}$ of the RL agent $100_0$, and the teammate RL agents $100_{T1}$, $100_{T2}$, $100_{T3}$. The Kalman filter generates the estimated target positions based on the sensor target data and the teammate sensor target data.

At 410, confidence levels are generated for each of the estimated target positions of the targets $102_O$, $102_{T1}$, $102_{T2}$, $102_{T3}$. The target tracking system 300 generates the confidence levels for the estimated target positions of each of the targets $102_O$, $102_{T1}$, $102_{T2}$, $102_{T3}$. In at least one embodiment, Fisher Information is calculated for the estimated target positions of the targets $102_O$, $102_{T1}$, $102_{T2}$, $102_{T3}$. The Fisher Information estimates the quality of the Kalman filter target position estimates with a scalar value. This value is used as the reward. The primary components of calculating this reward are the estimated target state vector and its error variance-covariance matrix (or simply the covariance). The estimated state indicates the location and motion of the target. The covariance should indicate the uncertainty or inaccuracy of the state estimate. The covariance matrix uncertainty grows the longer it has not seen a target and the Fisher reward reflects this. The calculated Fisher Information for an estimated target position is the scalar value that reflects the confidence level associated with the estimated target position of the target $102_O$, $102_{T1}$, $102_{T2}$, $102_{T3}$. The higher the scalar value the lower the confidence level.

At 412, an information metric reward is generated based on the confidence levels associated with the estimated target positions of the targets $102_O$, $102_{T1}$, $102_{T2}$, $102_{T3}$. The target tracking system 300 generates the information metric reward based on the confidence levels associated with the estimated target positions of the targets $102_O$, $102_{T1}$, $102_{T2}$, $102_{T3}$. In at least one embodiment, the information metric reward generator 316 generates the information metric reward based on the confidence levels associated with the estimated target positions of the targets $102_O$, $102_{T1}$, $102_{T2}$, $102_{T3}$. In at least one embodiment, Fisher Information is calculated for each estimated target position. The calculated Fisher Information for an estimated target position is the scalar value that reflects the confidence level associated with the estimated target position. The information metric reward is based on the scalar value.

At 414, a distance metric reward is generated based on the agent position of the RL agent $100_O$ and the estimated target positions of the targets $102_O$, $102_{T1}$, $102_{T2}$, $102_{T3}$. The target tracking system 300 generates the distance metric reward based on the agent position of the RL agent $100_O$ and the estimated target positions. In at least one embodiment, the distance metric reward generator 318 generates the distance metric reward based on the agent position of the RL agent $100_O$ and the estimated target positions. The distance metric reward is generated based on measured distances between the estimated target positions and the agent position of the RL agent $100_O$.

In various embodiments, a Lloyd algorithm is used to select a waypoint that the RL agent $100_O$ should drive too. The Lloyd algorithm receives the estimated target positions of the targets $102_O$, $102_{T1}$, $102_{T2}$, $102_{T3}$, the agent data, and the teammate data inputs. The Lloyd algorithm finds the estimated target positions that are closest to the RL agent $100_O$, if there are any. If there are, the Lloyd algorithm finds the mean of those estimated target positions that are closest to the RL agent $100_O$ and assigns the mean of the estimated target positions to a variable "waypoint." If there are not any, the Lloyd algorithm randomly selects an estimated target position from all of the estimated target positions and assigns the randomly selected estimated target position to the "variable" waypoint. A Euclidean distance is determined between the "variable" waypoint value and the agent position of the RL agent $100_O$. The Euclidean distance is scaled by a constant factor and output by the Lloyd algorithm as the distance metric reward.

At 416, a combined reward is generated based on the information metric reward and the distance metric reward. The target tracking system 300 generates the combined reward based on the information metric reward and the distance metric reward. In at least one embodiment, the combined reward generator 320 generates the combined reward based on the information metric reward and the distance metric reward. In at least one embodiment, a first weight is applied to the information metric reward to generate a weighted information metric reward and a second weight is applied to the distance metric reward to generate a weighted distance metric reward. The first weight is different from the second weight. The combined reward is generated based on a sum of the weighted information metric reward and weighted distance metric reward.

At 418, a movement action for the RL agent $100_O$ is generated for the next time step. The MARL algorithm 322 generates the movement action for the RL agent $100_O$ for the next time step based on the agent position of the RL agent $100_O$, the estimated target position of the selected target $102_O$, and the combined reward in accordance with a policy of the MARL algorithm 322. In various embodiments, the movement action for the RL agent $100_O$ for the next time step is one of a forward movement action, a backward movement action, a movement action to the right, and a movement action to the left.

At 420, a policy of a MARL algorithm 322 is updated. The target tracking system 300 updates the policy of the MARL algorithm 322. In at least one embodiment, the MARL algorithm 322 updates the policy of the MARL algorithm 322. In at least one embodiment the MARL algorithm is a Deep Q learning (DQN) algorithm. In at least one embodiment the MARL algorithm is Deep Deterministic Policy Gradient (DDPG) algorithm. The MARL policy is updated based on previous state, movement action(s) taken by the RL agent(s), new updated state following the implementation of movement action(s) and rewards. The previous state includes the agent data, the teammate data, and the estimated target positions.

At 422, the generated the movement action for the RL agent $100_O$ for the next time step is transmitted to the flight control system 306 for implementation. The method 400 returns to 402 following the implementation of the movement action.

Intelligence, surveillance, and reconnaissance (ISR) capabilities of unmanned aerial vehicles (UAVs) using multi-agent Reinforcement Learning (MARL) and information theory techniques to inform rewards may increase target tracking and surveillance performance. Information theory provides a robust theory of the information content of signals coming from sensing and communications. In ISR applications, information theory provides measurements of the quality of state estimates, allowing quantification of the information gains from sensing actions of a plurality of UAVs. Successful sensor management applications leverage a variety of metrics, including Fisher information, Renyi divergence, and Shannon mutual information. Information theoretic optimizations for communications and sensor management may provide significant advantages of information theoretic optimizations over traditional approaches.

By using information theoretic metrics as reward functions in a MARL algorithm, reinforcement learning (RL) agents are trained to select actions which maximize expected information gain without having to estimate this quantity at runtime. This approach has the potential to out-perform existing techniques, which rely on truncated estimates of expected information due to computational limitations.

An additional technical advantage to MARL over current techniques is its scalability. Sensor management of large networks remain challenging due to the high dimensionality of the state and action space. MARL overcomes this scalability issue by distributing the global control to each local RL agent.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A reinforcement learning (RL) agent comprising:
   a sensor system;
   a communication system; and
   a target tracking system comprising:
      at least one processor; and
      at least one memory communicatively coupled to the at least one processor, the at least one memory comprising instructions that upon execution by the at least one processor, cause the at least one processor to:
         receive agent data comprising an agent position and sensor target data from the sensor system;
         receive teammate data from a plurality of teammate RL agents via the communication system, the teammate data for each of the plurality of teammate RL agents comprising a teammate position and teammate sensor target data;
         generate an estimated target position of a target based on the agent data and the teammate data;
         generate an information metric reward based on a confidence level associated with the estimated target position, the confidence level being based on the estimated target position and historical estimated target positions for the target;
         generate a distance metric reward based on the agent position and the estimated target position;
         generate a combined reward based on the information metric reward and the distance metric reward; and
         generate a movement action for the RL agent based on the agent position, the estimated target position, and the combined reward in accordance with a multi-agent reinforcement learning (MARL) algorithm.

2. The RL agent of claim 1, wherein the RL agent is an unmanned aerial vehicle (UAV).

3. The RL agent of claim 1, wherein the at least one memory comprises instructions that upon execution by the at least one processor, cause the at least one processor to:
   receive the agent data and the teammate data at a Kalman filter; and
   generate, by the Kalman filter, the estimated target position based on the agent data and the teammate data.

4. The RL agent of claim 1, wherein the at least one memory comprises instructions that upon execution by the at least one processor, cause the at least one processor to:
   calculate Fisher Information for the estimated target position, the Fisher Information being operable to provide the confidence level associated with the estimated target position using a scalar value; and
   generate the information metric reward based on the scalar value.

5. The RL agent of claim 1, wherein the at least one memory comprises instructions that upon execution by the at least one processor, cause the at least one processor to generate the distance metric reward based on a measured distance between the estimated target position and the agent position.

6. The RL agent of claim 1, wherein the MARL algorithm comprises a Deep Q learning (DQN) algorithm.

7. The RL agent of claim 1, wherein the MARL algorithm comprises a Deep Deterministic Policy Gradient (DDPG) algorithm.

8. The RL agent of claim 1, wherein the at least one memory comprises instructions that upon execution by the at least one processor, cause the at least one processor to generate the movement action for the RL agent, the movement action being one of a forward movement action, a backward movement action, a left movement action, and a right movement action.

9. The RL agent of claim 1, wherein the at least one memory comprises instructions that upon execution by the at least one processor, cause the at least one processor to:
   apply a first weight to the information metric reward to generate a weighted information metric reward;
   apply a second weight to the distance metric reward to generate a weighted distance metric reward, the first weight being different from the second weight; and
   generate the combined reward based on a sum of the weighted information metric reward and the weighted distance metric reward.

10. The RL agent of claim 1, wherein the at least one memory comprises instructions that upon execution by the at least one processor, cause the at least one processor to:
   enable the RL agent to track the target within a finite environment; and receive the teammate data from the plurality of teammate RL agents, the plurality of teammate RL agents being configured to track the target within the finite environment.

11. A method of tracking a target by a reinforcement learning (RL) agent comprising:
receiving agent data comprising an agent position and sensor target data from a sensor system of the RL agent;
receiving teammate data from a plurality of teammate RL agents via a communication system of the RL agent, the teammate data for each of the plurality of teammate agents comprising a teammate agent position and teammate sensor target data;
generating an estimated target position of the target based on the agent data and the teammate data;
generating an information metric reward based on a confidence level associated with the estimated target position, the confidence level being based on the estimated target position and historical estimated target positions for the target;
generating a distance metric reward based on the agent position and the estimated target position;
generating a combined reward based on the information metric reward and the distance metric reward; and
generating a movement action for the RL agent based on the agent position, the estimated target position, and the combined reward in accordance with a multi-agent reinforcement learning (MARL) algorithm.

12. The method of claim 11, wherein the agent comprises an unmanned aerial vehicle (UAV).

13. The method of claim 11, further comprising:
receiving the agent data and the teammate data received at a Kalman filter; and
generating, by the Kaman filter, the estimated target position based on the agent data and the teammate data.

14. The method of claim 11, further comprising:
calculating Fisher Information for the estimated target position, the Fisher Information being operable to provide the confidence level associated with the estimated target position using a scalar value; and
generating the information metric reward based on the scalar value.

15. The method of claim 11, further comprising generating the distance metric reward based on a measured distance between the estimated target position and the agent position.

16. The method of claim 11, wherein the MARL algorithm comprises a Deep Q learning (DQN) algorithm.

17. The method of claim 11, wherein the MARL algorithm comprises a Deep Deterministic Policy Gradient (DDPG) algorithm.

18. The method of claim 11, further comprising generating the movement action for the RL agent, the movement action being one of a forward movement action, a backward movement action, a left movement action, and a right movement action.

19. The method of claim 11, further comprising:
applying a first weight to the information metric reward to generate a weighted information metric reward;
applying a second weight to the distance metric reward to generate a weighted distance metric reward, the first weight being different from the second weight; and
generating the combined reward based on a sum of the weighted information metric reward and the weighted distance metric reward.

20. The method of claim 11, further comprising:
enabling the RL agent to track the target within a finite environment; and
receiving teammate data from the plurality of teammate RL agents, the plurality of teammate RL agents being configured to track the target within the finite environment.

* * * * *